United States Patent
Lee et al.

(10) Patent No.: US 7,606,189 B1
(45) Date of Patent: Oct. 20, 2009

(54) ARCHITECTURE OF INTERNET PROTOCOL-BASED CELLULAR NETWORKS

(75) Inventors: David Jau Young Lee, San Ramon, CA (US); Ce Xu, Concord, CA (US); William Chien-Yeh Lee, Danville, CA (US)

(73) Assignee: Cellco Partnership, Bedminster, NJ (US)

( * ) Notice: Subject to any disclaimer, the term of this patent is extended or adjusted under 35 U.S.C. 154(b) by 648 days.

(21) Appl. No.: 09/589,974

(22) Filed: Jun. 8, 2000

Related U.S. Application Data

(60) Provisional application No. 60/138,221, filed on Jun. 9, 1999.

(51) Int. Cl.
*H04W 4/00* (2009.01)
*H04W 36/00* (2009.01)
*H04L 12/56* (2006.01)
*H04J 3/22* (2006.01)

(52) U.S. Cl. .............. 370/328; 370/338; 370/400; 370/466; 455/432.1; 455/436

(58) Field of Classification Search .......... 370/310, 370/310.2, 338, 352–354, 356, 401, 410, 370/331, 328, 400, 466; 455/422, 432, 432.1–444
See application file for complete search history.

(56) References Cited

U.S. PATENT DOCUMENTS 5,684,791 A * 11/1997 Raychaudhuri et al. .. 370/310.2
5,970,059 A * 10/1999 Ahopelto et al. ............ 370/338
6,137,791 A * 10/2000 Frid et al. .................. 370/352
6,215,779 B1 * 4/2001 Bender et al. .............. 370/338
6,359,880 B1 * 3/2002 Curry et al. ................. 370/352
6,385,195 B2 * 5/2002 Sicher et al. ................ 370/356
6,404,754 B1 * 6/2002 Lim ........................... 370/338
6,535,493 B1 * 3/2003 Lee et al. .................... 370/329
6,654,359 B1 * 11/2003 La Porta et al. ............ 370/328
6,711,147 B1 * 3/2004 Barnes et al. ............... 370/338

FOREIGN PATENT DOCUMENTS

WO    WO 9843456 A1 * 10/1998
WO    WO 9843456 A2 * 10/1998

OTHER PUBLICATIONS

U.S. Appl. No. 60/127,406.*

* cited by examiner

*Primary Examiner*—Tri H Phan
(74) *Attorney, Agent, or Firm*—Gates & Cooper LLP

(57) ABSTRACT

Integration of the cellular network with an IP based network is disclosed. An integrated IP/cellular network can route packetized voice and data together in a more efficient manner. The present invention integrates IP based standards for a cellular IP solution with cellular centric vs. IP message gateway as the demarcation point. However, the present invention also provides support for cellular unique features for better performance. Multiple architectures are proposed to ease migration to a combined network as well as to show the various levels of support provided.

15 Claims, 12 Drawing Sheets

ARCHITECTURE OF INTERNET PROTOCOL-BASED CELLULAR NETWORKS

CROSS REFERENCE TO RELATED APPLICATIONS

This application claims priority under 35 U.S.C. § 119(e) of U.S. Provisional Patent Application No. 60/138,221, filed Jun. 9, 1999, entitled "WIRELESS IP" by David J. Y. Lee et al., which application is incorporated by reference herein.

BACKGROUND OF THE INVENTION

1. Field of the Invention

The present invention relates to cellular telephone systems, and, in particular, to wireless internet protocol (IP) use of cellular telephone systems.

2. Description of the Related Art

The Internet is quickly becoming an integral part of everyday life. As more people begin using the Internet, Internet traffic has grown at an exponential rate. Within a short time, Internet usage is expected to become as commonplace as voice telephone usage is today.

As such, the demand for data services is increasing. Several methods have been proposed to utilize the cellular telephone network for transfer of Internet Protocol (IP) data. However, the cellular network would require modification to properly perform IP data transfer. Most solutions include replacing the Mobile Switching Center (MSC) with a fast and powerful router, but there is no definite conclusion on how the IP should be implemented at the Base Station Controller (BSC) and/or the Base Transceiver Station (ITS).

Before any solution can be determined, each cellular network element must be reviewed for functionality. For example, the MSC functions include routing calls, interworking to the Public Land Mobile Network (PLMN) and the Public Switching Telephone Network (PSTN), call processing, and roaming. The BSC functions include connections to the MSC ("the A interface"), mobility management, call processing and resource management. The BTS functions include signal modulation and demodulation, connection to the BSC ("the Abis interface") and the RF channel ("the Air interface"). There are also other network elements like the Equipment Identity Register (EIR), Home Location Register/Visitor Location Register (HLR/VLR) and billing system to perform Authorization, Accounting and Authentication (AAA) related functions.

The current IP development supports most of these functions. For example, mobile IP/SIP solves the mobile roaming issues, the Diameter solves the AAA issues, H.323 solves the call control and services issues, and the Home Agent/Foreign Agent (HA/FA) solves the HLR and VLR issues. However, the current IP development in the cellular arena addresses each problem individually, without taking into account effects that solutions to the other problems will have on the current undertakings. As such, integrating these available IP-based features into a cellular network to provide high quality voice and data services are needed.

It can be seen, then, that there is a need in the art to integrate available IP-based features into a cellular network. It can also be seen that there is a need in the art for an integrated solution of IP features and cellular features that provide high-quality voice delivery. It can also be seen that there is a need in the art for an integrated IP and cellular network to provide high quality data services.

SUMMARY OF THE INVENTION

To overcome the limitations in the prior art described above, and to overcome other limitations that will become apparent upon reading and understanding the present specification, the present invention discloses a system and a method for communicating over an internet protocol-based communications network. The system comprises a handoff server, a Base Transceiver Station (BITS), and a home agent (HA). The BTS communicates with a mobile telephone within a transmission area associated with the BTS, and the handoff server communicates with the BTS using a proprietary interface. The HA communicates with the handoff server for transmitting messages through an internet-protocol network, wherein messages between the HA and the mobile telephone use an internet protocol between the HA and the handoff server and the proprietary interface between the router and the BTS. The method comprises sending a message from a home agent (HA) to a router over an internet protocol based network forwarding the message from the router to a base transceiver station (BTS) using a proprietary format, and forwarding the message from the BTS to a mobile telephone that is within a geographical communications zone of the BTS.

An object of the present invention is to integrate available IP-based features into a cellular networks. Another object of the present invention is an integrated solution of IP features and cellular features that provide high-quality voice delivery. Another object of the present invention is an integrated IP and cellular network to provide high quality data services.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention concentrates on the architecture of such IP-based cellular networks. The present invention proposes several feasible implementations of IP functionality on BSC and BTS, or replaces the BSC or BTS completely. In addition, the present invention addresses some of the interworkings with other IP networks and traditional telephone networks. Further, the present invention addresses some performance issues with the IP network in implementing real-time services.

Figure 1:
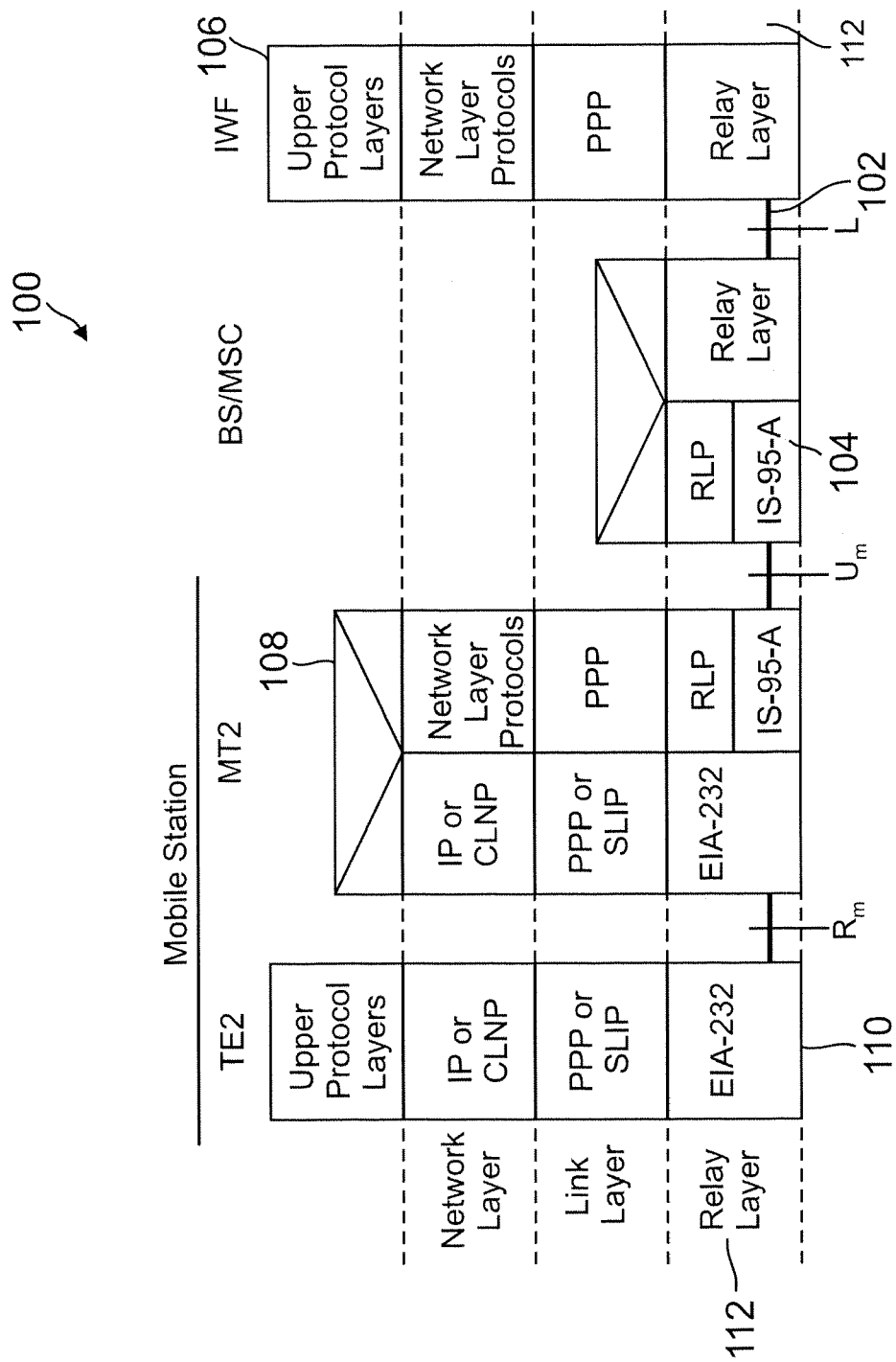
FIG. 1 illustrates a direct IP connection to the IWF as described in the related art.

FIG. 1 illustrates a direct IP connection to the IWF as described in the related art.

As shown in FIG. 1, IS 707 proposed system 100, which uses a direct IP connection 102 to connect the BS/MSC 104 to the Interworking Function (IWF) 106. This use of a direct IP connection from a mobile user 108 or user terminal 110 to the IWF 104 uses IP to transmit messages on the relay layer 112. A direct IP connection 102 has minimal impact on the cellular system 100 because all the mobility management, call processing, and roaming functions remain within the cellular network.

However, only limited benefits can be achieved through this architecture. Mobility management, roaming, and Hand Offs (HO) are not addressed in the direct IP connection system 100.

The present invention removes the MSC and provides IP functions within the BSC and BTS to produce more effective cost-savings on the infrastructure and rapid wireless data adoption. The present invention solves the problems of mobility management, roaming, and Hand Offs ("HO") using an IP-based solution.

The present invention uses IP gateways for translating cellular call processing based messages, e.g., IS634, ISUP, and IS41, to IP based messages, e.g., H.323, SIP, Mobile IP, and Diameter. These translations need to reside in the demarcation point between the cellular and IP networks to support an IP ready handset. To support voice services using IP with a traditional handset that uses no IP address/stack, another level of translating mobile numbers to IP addresses is needed. This additional level of translation can be performed by an SS7 gateway responsible for the translation between the HLR and the IP network, or by migrating the HLR to Diameter.

Network Architecture

Figure 2:
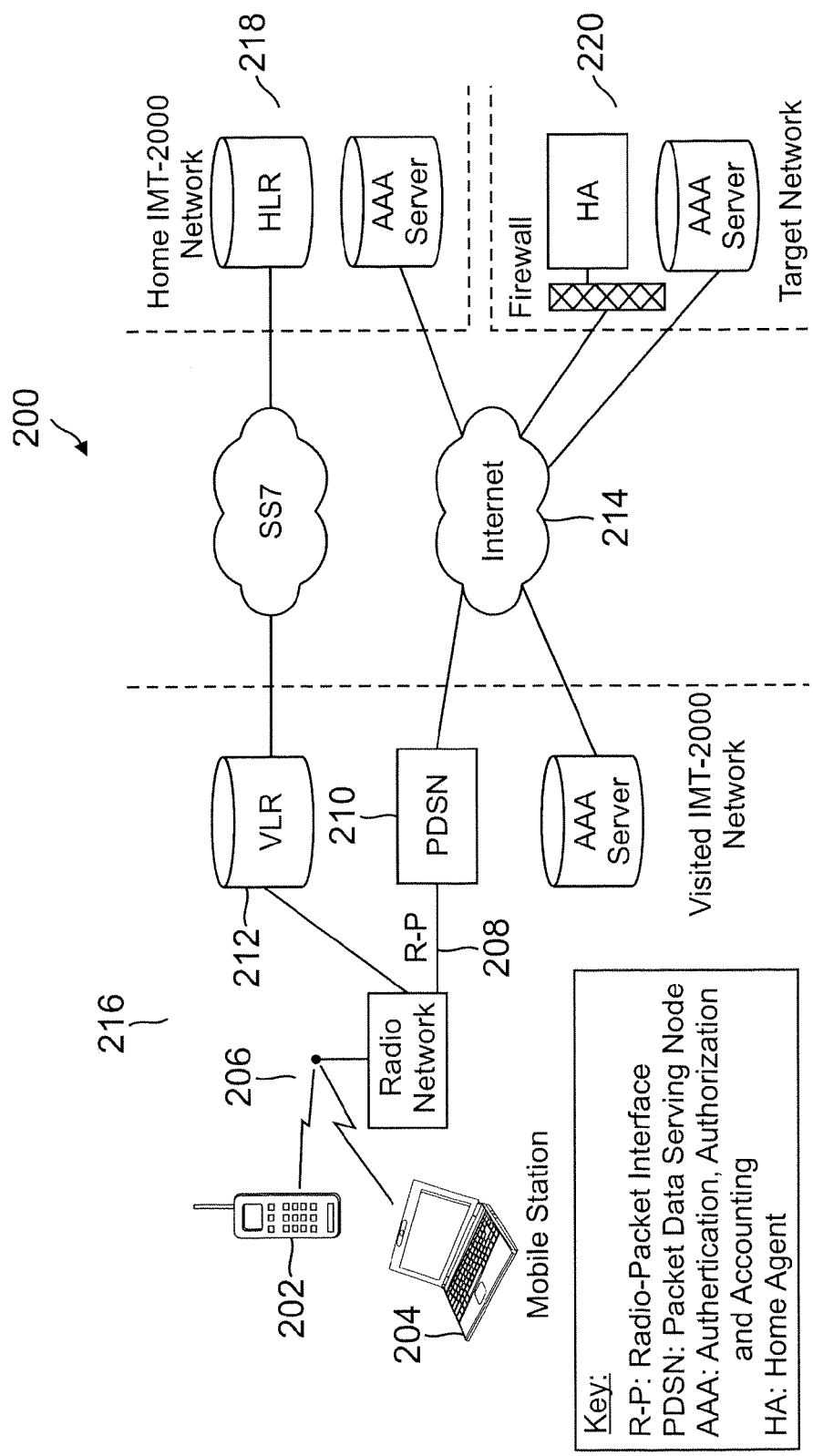
FIG. 2 shows the current 3G architecture derived from TR45.6[2]

FIG. 2 shows the current Third Generation (3G) architecture 200 derived from TR45.6[2]. As can be seen from FIG. 2, the architecture 200 shows mobile phone 202 and mobile terminal 204 connecting with the cellular network 206, the cellular network comprising the MSC, BTS, and BSC. The cellular network 206 has a radio-packet interface 208 to the Packet Data Serving Node (PSDN) 210. The cellular network also has a connection to the VLR 212. The Internet 214, and, as such, IP, is used to couple the visited network 216 to the home network 218 and the target network 220. As such, the 3G architecture 200 does not provide IP within the BSC and BTS. The architecture 200 lacks an interrelationship between IP/PLMN/PSTN so control messages and data pipes are transparent to the user. This translation includes a mapping of the mobile number to the TCP/IP address so that a regular handset 202 without an internal IP stack can also run on the IP network. Further, the architecture 200 lacks any features for the wireless part of the IP, e.g., radio network 206, etc. to ensure cellular unique features can be supported.

Translation Between Cellular/PSTN/PLMN

Figure 3:
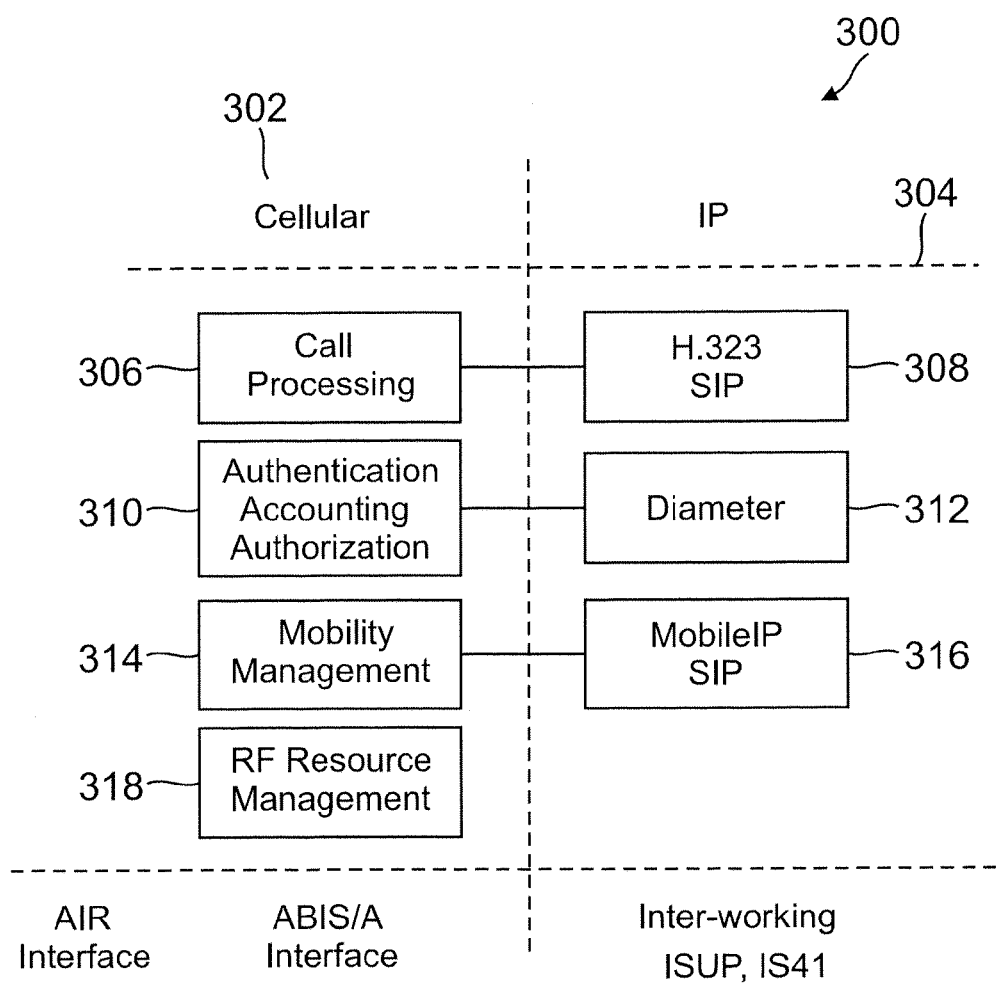
FIG. 3 illustrates the existing standard based mapping between the cellular and IP networks.

Cellular traffic can "ride" on the IP network as long as the interface which terminates cellular based messaging maps the cellular based messages into compatible IP messages. Also, data on the cellular network can "ride" on the IP network, depending on the location of the IP gateway to the cellular network FIG. 3 illustrates the existing standard based mapping between the cellular and IP networks.

Map 300 illustrates that cellular network 302 and the IP network 304 are mapped in a one-to-one correspondence, where call processing 306 maps into the H.323 SIP 308, AAA 310 maps into diameter 312, and MobilityManagement 314 maps into the Mobile IP SIP 316. RF Resource Management 318 is left as a standalone feature for the cellular system 302. However, the present map 300 does not take into account any integration between the cellular network 302 and the IP network 304; there is merely a translation of functions taking place. The present invention strips away the barriers between the cellular network 302 and IP network 304 and replaces those areas of each network 302 and 304 that are better served with features from the other network.

The present invention accesses the available networks and integrates the cellular and IP networks. In a traditional cellular system, the BSC is responsible for mobility management, call processing and radio resource management. The BSC also comprises a transcoder, vocoder, and a switching matrix. For a combined cellular/IP network, the BSC hardware functions can be replaced by a router and additional Digital Signal Processing (DSP) based software/hardware.

The MSC functionality includes call setup, connection and features, routing, authentication and accounting. These functions can be replaced by existing IP protocols and applications, e.g., H.323/SIP for call set up and connection, and Diameter for accounting, authentication, and authorization. The mobility functions can be replaced by mobile IP/SIP through tunneling between HA and FA, and HO can also be supported through tunneling. A Soft Hand Off (SHO) in a CDMA system can be supported by using the existing Asynchronous Transfer Mode (ATM) protocols.

IS 95 call processing, mobility management, and resource management related messages need to be translated and adapted to an IP based message schema. The SHO schema, which is crucial to the CDMA cellular network, is solved by the present invention by adopting an ATM protocol into the cellular network. ATM supports multimedia applications and high Quality of Service (QoS). ATM protocols are not optimized in capacity with small bandwidths. As more cellular frequencies are allocated for data services and for multimedia applications, e.g., convergence of voice and data, the statistical gain by combining all cellular frequencies make the implementation of ATM in a cellular network through the present invention worthwhile.

The ATM Virtual Tributary is a very inefficient way of emulating the circuit switching network. However, a VPI/VCI approach has proven to be more effective in a wider bandwidth environment. Also, network management overhead is imbedded in the ATM/SONET header in the existing proposal. The current TR45.5 proposal supports PPP on top of RLP. PPP allows direct connection from point to point and is the most efficient mean of connecting two points in the network. Although the IP community is enhancing MPLS for VPN and QoS, it is difficult to achieve the QoS provided by ATM since IP is connectionless originated.

Another issue addressed by the present invention is the mapping from the mobile number to an IP address. This can be done by the gateway responsible for phone numbers and IP addresses.

Wireless IP Architecture

The present invention provides multiple architectures for integrating IP and cellular telephone networks. For example, the first architecture replaces the BSC functionality with an application specific router, and eliminates unnecessary HOs to allow both data and voice to ride on the IP pipe. The MSC is eliminated and SS7 related messages will be placed in an IP format at the BSC and routed to IP network. The IP connection is established from the router to the mobile for data transfer, and the BSC has a link layer connection for voice and data applications. Intra-BSC SHO is maintained through the BSC mobility management functions, and inter-BSC HO is implemented through inter-BSC tunneling.

A second architecture enhances the BSC to have ATM connections to the handoff server (HS). The FA remains a function of BSC, and an ATM connection would be established from the BSC to the HS. Intra-BSC/Inter-BSC HO is maintained through ATM layer functionality, and an ATM connection from BSC to Hs supports SHO in a CDMA system.

A third architecture enhances both the BSC (HO router) and the BTS to have ATM and IP functionalities. The BSC is replaced with an HO server. The BTS supports ATM, and the QoS can be achieved by synchronizing BTSs involved in SHO by using a nail-up connection or by setting up predetermined times for transmitting. The FA remains at the BTS, and IP connections between the mobile, BTS, and HO server are established. SHO are supported through direct PVC connections from the mobile to a SHO server which bypasses the BTS IP layer, and intra-BSC HO is maintained through a virtual IP connection.

A fourth architecture enhances the BTS to have IP functionality and BSC/FA functionality. This architecture makes IP BTS possible without depending on layer 2 capabilities since more QoS features will be developed for the IP layer. With CDMA synchronized and dedicated channel characteristics, it is highly possible to support this architecture. The architecture requires an efficient IP and lower layer interface to function properly. An IP connection from BTS to TE2 is established, and inter-BTS HO is maintained through BTS tunneling and updating the HA.

Wireless IP Architectures

Replace BSC with Router

Figure 4:
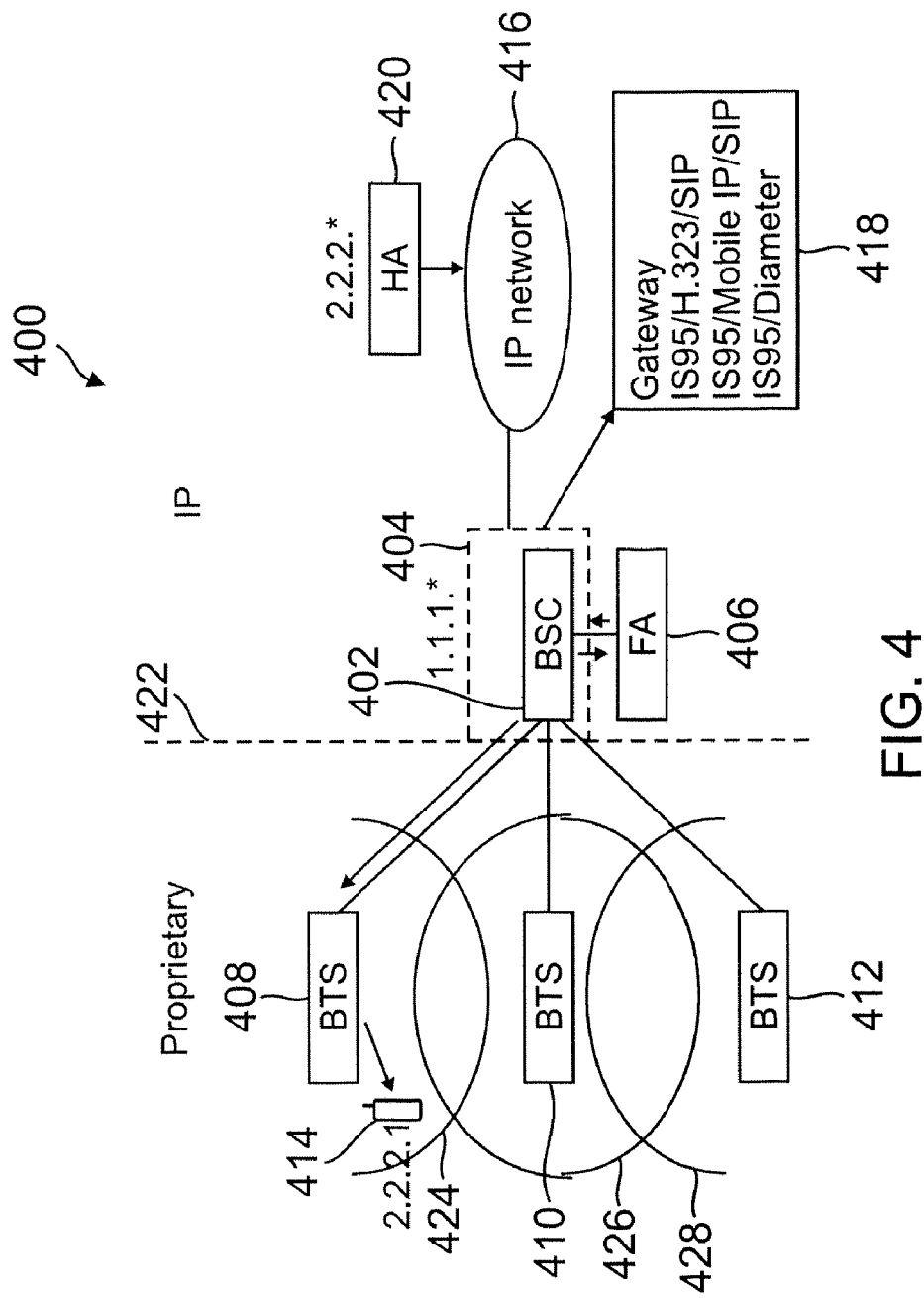
FIG. 4 illustrates replacing the BSC with a router in accordance with the present invention.

FIG. 4 illustrates replacing the BSC with a router in accordance with the present invention. In architecture 400, the MSC is removed from architecture 400 and the BSC 402 is replaced with a router (BSC router) 404, that has enhanced IP routing and Foreign Agent (FA) 406 functions. The router 404 interfaces with the BTS 408, 410, and 412, which interface with the mobile telephone 414 throughout each BTS 408-412 coverage area. The Internet (IP network) 416, and other network features 418, interface directly with the router 404, instead of interfacing with the MSC as shown in FIG. 1. The Home Agent (HA) 420 now interfaces through the IP network 416.

The interface between the BTS 408-412 and the BSC 402 is replaced with a similar or the same interface between the BTS 408-412 and the router 404. Intra-BSC 404 handoffs are handled as before since all mobility management functions still remain in the BSC router 404. From the BSC router 404 to the IP network 416, IP-based communications are used. In addition, the FA 406 is added to the BSC router 404 to handle the tunneling between the HA 420 and the FA 406. Inter-BSC router 404 hand-offs are done by the first FA 406 anchoring during the handoff, and the HA 420 updating when completing the handoff.

As shown in FIG. 4, a packet destined for the mobile telephone 414 (IP address 2.2.2.1) will be routed from the HA 420 (IP address 2.2.2.*) through the FA 406 (IP address 1.1.1.*). When an intra-BSC router 404 handoff occurs, e.g., between BTS 408 and BTS 410, the FA 406 does not change, and therefore there is no impact on the IP network 416. FIG. 4 also illustrates division line 422, where all communications on the left of line 422 are proprietary in nature, e.g., CDMA, TDMA, etc, whereas communications on the right of line 422 use IP. Coverage areas 424-428 are shown as corresponding with BTS 408-412, respectively.

Inter-BSC Handoff

Figure 5:
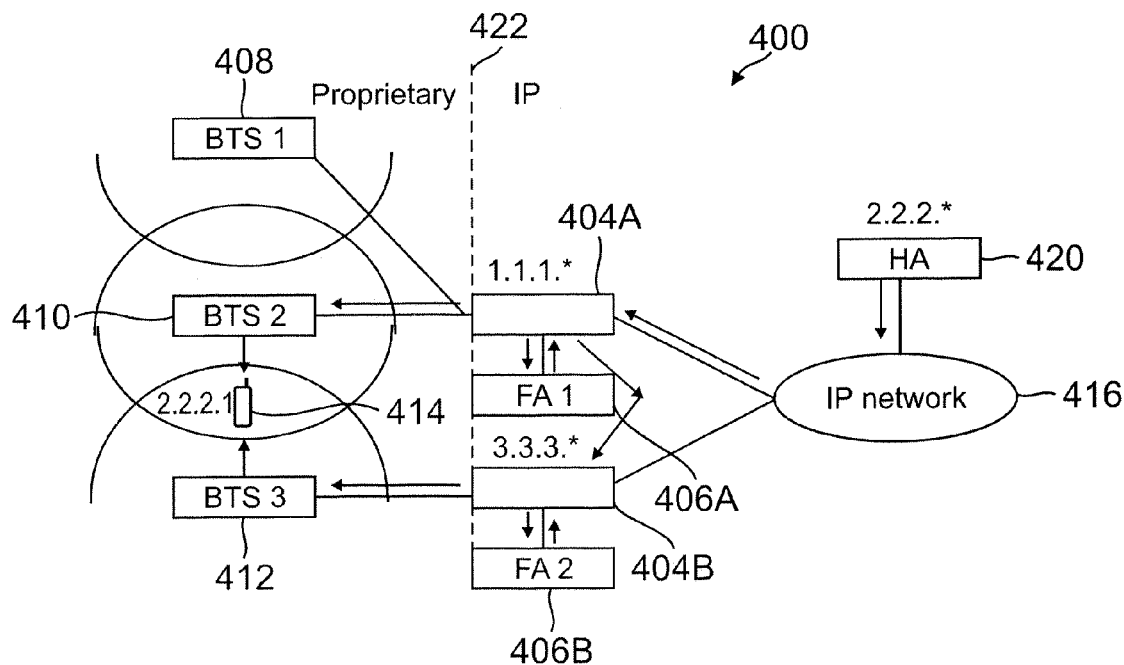
FIG. 5 illustrates an inter-BSC handoff, in the configuration of FIG. 4.

FIG. 5 illustrates an inter-BSC handoff in the configuration of FIG. 4.

Configuration 400 as shown in FIG. 5 illustrates two BSC routers BSC1 router 404A and BSC2 router 404B, and two Foreign Agents FA1 406A and FA2 406B associated with the BSC routers 404A and 404B respectively. An incoming data packet is routed from the HA 420 (IP address 2.2.2.*) through the IP network 416 to BSC1 router 404A, and to the FA1 406A (IP address 1.1.1.*). This is then passed to the BSC2 router 404B and FA2 406B (IP address 3.3.3.*) and finally delivered to the mobile telephone 414.

When a HO is completed, the HA 420 is updated with the new FA address, e.g., FA2 406B, and future data packets will be sent directly to BSC2 router 404B.

In this architecture 400, the voice service, assuming the mobile handset 414 does not have an IP stack, is supported by converting CDMA voice packets to a "voice over IP" coding scheme with DSP (QCELP/G.729), and is transmitted through the IP route set up by H.323, or any other IP application protocols for setting up the IP path from HA 420 to mobile telephone 414. Mobile to mobile calls can be supported with no vocoding between two mobiles. Control messages (call processing related, IS634 in this case) are translated into H.323 messages. If the user terminal or mobile telephone 414 supports an IP stack, H.323 will be set up all the way to the user terminal or mobile telephone 414.

ATM Connection Between BSC and HS

Figure 6:
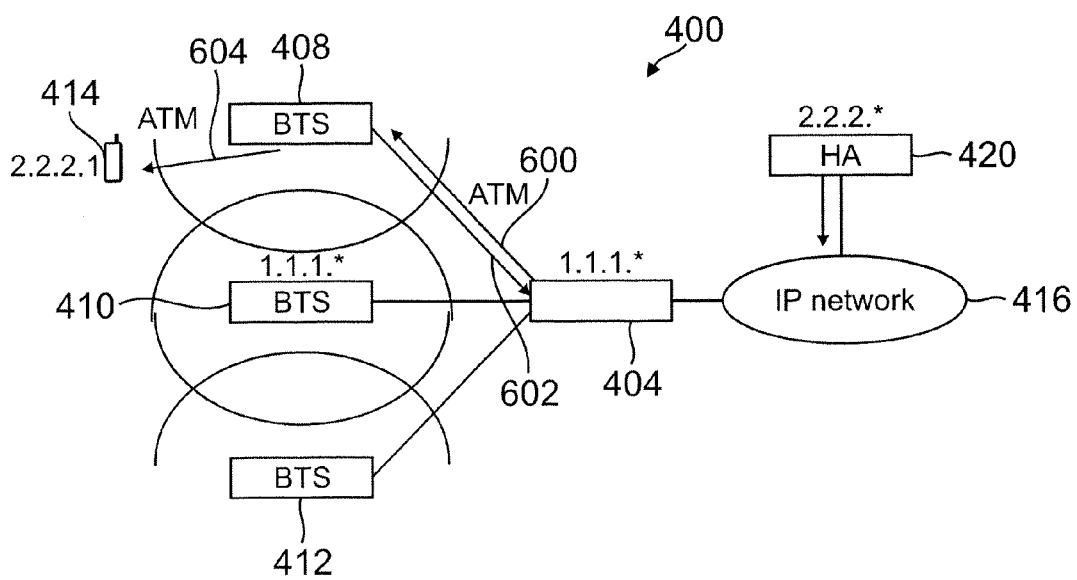
FIG. 6 illustrates that Asynchronous Transfer Mode (ATM) can be used as the communications layer 2 in the present invention.

FIG. 6 illustrates that Asynchronous Transfer Mode (ATM) can be used as the communications layer 2 in the present invention.

Between BSC router 404 and BTS 408-412, ATM can be used as the proprietary interface along paths 600 and 602. Further, ATM can be used between BTS 408-412 and mobile 414 along connection 604 if desired. The use of ATM between BSC router 404 and BTS 408-412, and the use of ATM between BTS 408-412 and mobile telephone 414 supports a more flexible QoS, as well as supporting additional multimedia services. Soft Hand Offs (SHO) in architecture 400 can also be supported through many available ATM features. For example, a nail-up connection can be established from the BSC router 404 to the mobile telephone 414 through circuit emulation. The connection 604 can also be supported by predefining the timing for the frame to be transmitted from the BTS 408-413 to the mobile telephone 414. The timing connection is possible since CDMA is a synchronized system and each mobile telephone 414 has a dedicated channel. Frames for the SHO region can be scheduled to be transmitted at a predefined time. This might introduce a certain delay, however, the transmission is possible with higher bandwidths and higher processing power. With this architecture 400, the soft handoff can be easily resolved.

BIS Riding the IP on ATM with a HO Server (No BSC)

Figure 7:
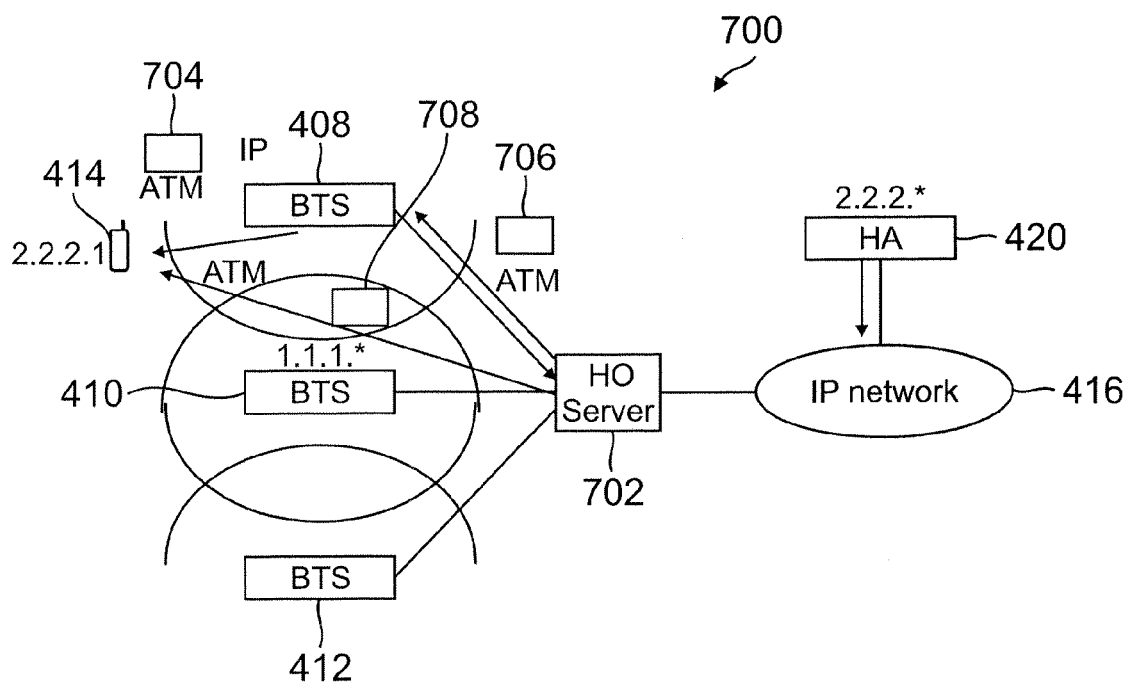
FIG. 7 illustrates the architecture of the present invention using a hand-off server as a replacement for the BSC.

FIG. 7 illustrates the architecture of the present invention using a hand-off server 702 as a replacement for the BSC and/or BSC router described with respect to FIGS. 4-6. In architecture 700, the ATM is used as the layer 2 protocol. The mobile telephone 414, the BTS, 408-412, and the HO server 702 are running IP on top of ATM. While in normal, non-SHO operation, the mobile telephone 414 is connected to the BTS 408 through a Permanent Virtual Circuit (PVC1) 704, and the BIS 408 is connected to the HO server 702 through IP ATM (PVC2) 706. While in the SHO area, the mobile telephone 414 is connected to the HO server 702 directly through ATM (PVC3) 708. Therefore, there is only one IP hop between the soft HO server 702 and the user terminal or mobile telephone 414. Synchronization can be achieved for the SHO application. In this architecture 700, the IP is running on top of the ATM layer. The BSC is eliminated from the architecture 700 of the network. In the SHO region, the traffic path is running on PVC3 708. This architecture is more efficient in the use of system resources, since statistical multiplexing can be applied.

Utilization of a virtual IP on top of ATM, the data path gets switched from PVC1 704 and PVC2 706 to PVC3 708, which creates only one IP hop between the soft HO server 702 and the user terminal or mobile telephone 414, which makes transmit synchronization achievable. There are direct ATM as well as IP connections from the BTS 408-412 to the mobile telephone 414. The present invention's approach of pushing the ATM to the BTS layer supports SHO issues more effectively. Some of the BSC functionality is then pushed to the BIS 408-412, e.g., power control.

Figure 8:
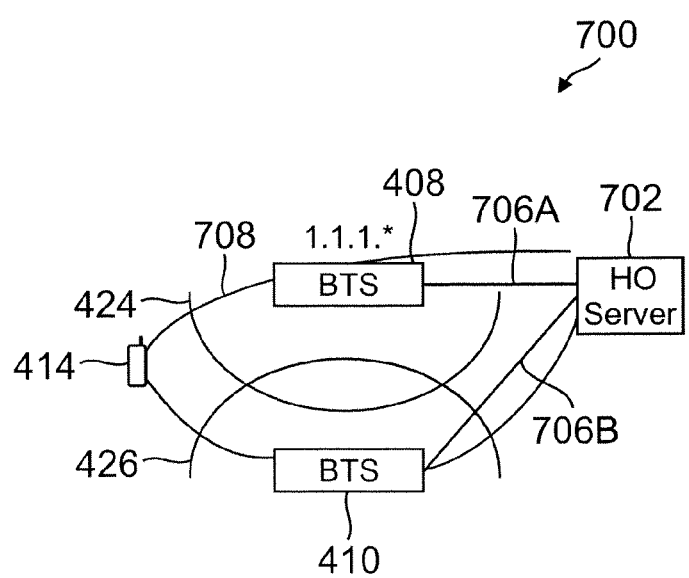
FIG. 8 illustrates the SHO transfers of the architecture of FIG. 7.

FIG. 8 illustrates the SHO transfers of the architecture of FIG. 7. When mobile telephone 414 is within zone 424 associated with BTS 408, PVC1 706A, which connects BTS 408 to HO server 702, is used to connect the mobile telephone 414 to the HO server 702. When mobile telephone 414 is within zone 426 associated with BTS 410, PVC1 706B, which connects BTS 410 to HO server 702 is used to connect mobile telephone 414 to the HO server 702. However, in SHO regions, PVC3 708 is used to connect mobile telephone 414 to the HO server 702 directly without using either BTS 408 or 410, or PVC1 706A or PVC1 706B.

BTS with IP (Independent of Layer 2 Protocol)

When the IP stack is pushed into the BTS, the issue of SHO arises because there is no way to guarantee layer 3 packet synchronization. However, with enhancements to the IP layer on QoS, the IP can support most features that are currently supported by ATM. With wider bandwidth, higher processing power, and effective interfacing between IP and layer 2, the IP can support more time critical or QoS sensitive applications. Since CDMA systems are synchronized and each mobile has a dedicated channel, it is possible for BTS/MS to transmit and receive data at predetermined system times. This is similar to what is implemented in the CDMA system to support voice only services while transmitting and receiving voice at predefined times. However, the IP/layer 2 interface needs to be developed so messaging between these two layers can be effective and guaranteed for limited time delays only.

Intra FA Handoff (FA Update)

Figure 9:
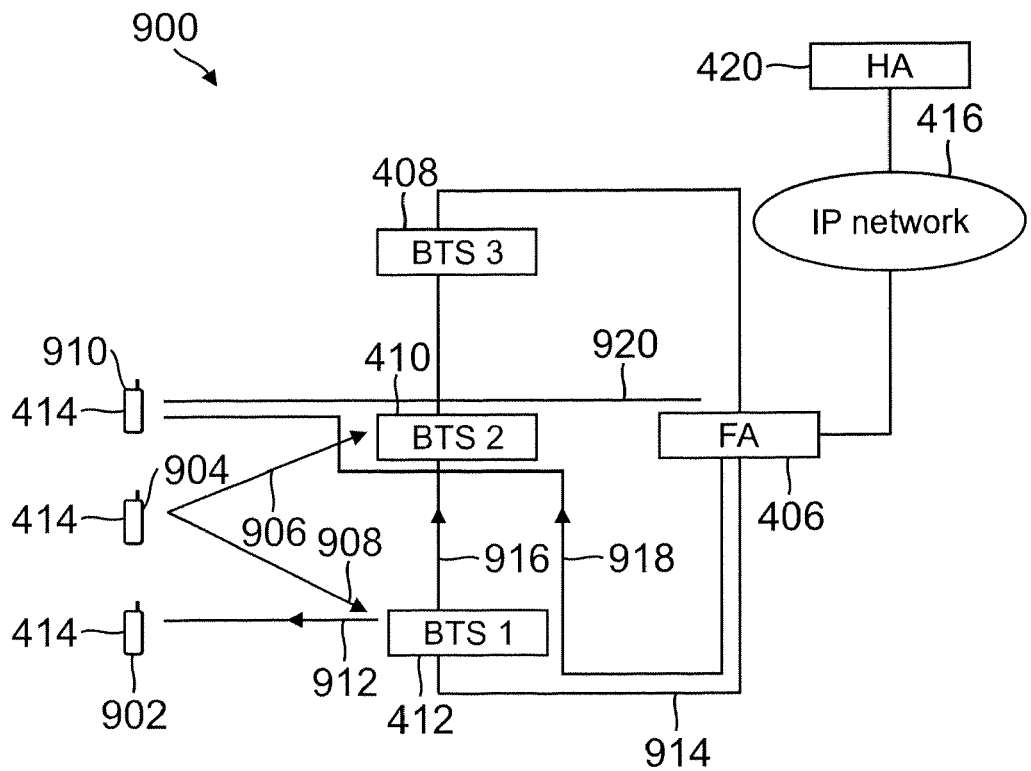
FIG. 9 illustrates an Intra-FA handoff through a FA update architecture as embodied in the present invention.

FIG. 9 illustrates an Intra-FA handoff through a FA update architecture as embodied in the present invention. Architecture 900 of the present invention shows the BTS1 412 establishing an IP connection with the mobile telephone at position 902. As mobile telephone 414 moves to position 904, BTS1 412, or mobile telephone 414, realizes that mobile telephone 414 must be handed off to another BTS, in this case BTS2 410. The mobile telephone 414 then sends a HO message to both BTSs 410 and 412, as shown by messages 906 and 908. The mobile telephone 414 is served by the BTS1 412 via path 912 from BTS1 to mobile telephone 414 and path 914 from the FA 406 to BTS1 412 until the mobile telephone 414 reaches position 910, when it can be anchored to BTS2 410 via BTS1 412 and path 916, and the BTS1 412 sends a location update to the FA 406 via path 914 for the mobile telephone 414. The mobile IP packet is then delivered to the mobile telephone 414 via path 918, which is from FA 406 through BTS1 412 to BTS2 410 to mobile telephone 414 until the FA 406 is updated, whence the mobile telephone 414 will receive packets directly from the FA 406 to the BTS2 410 via path 920 after the FA 406 is updated and the handoff is completed.

Intra FA HO (HA Update)

Figure 10:
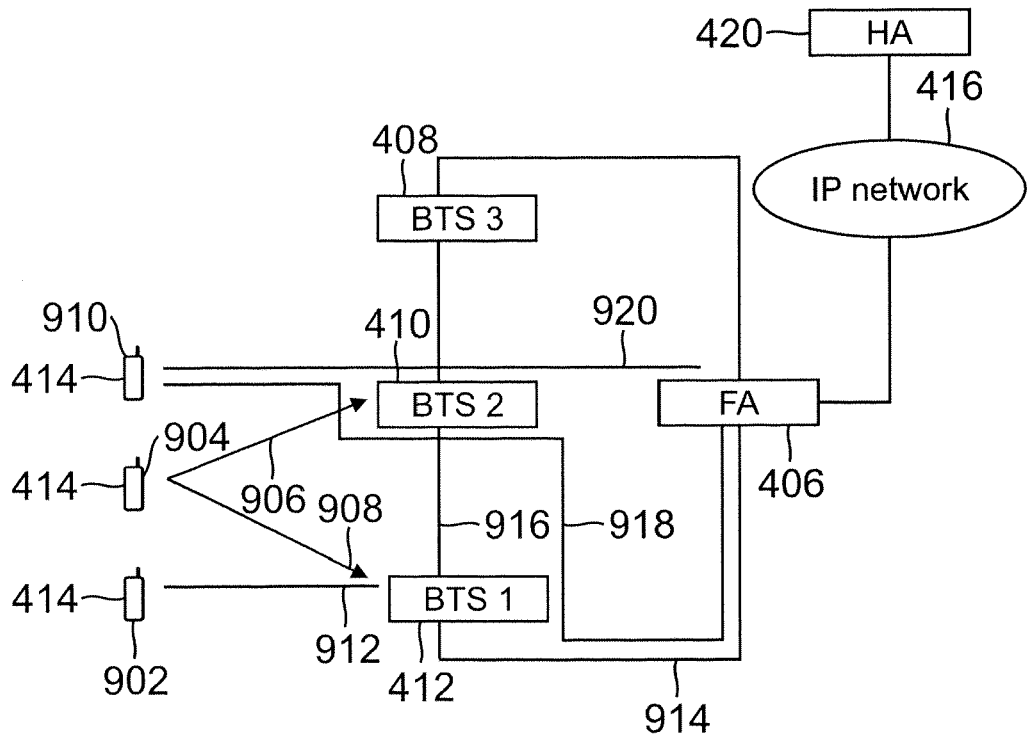
FIG. 10 illustrates an Intra-FA handoff through a HA update architecture as embodied in the present invention.

FIG. 10 illustrates an Intra-FA handoff through a HA update architecture as embodied in the present invention.

Architecture 900 of the present invention shows the BTS1 412 establishing an IP connection with the mobile telephone at position 902. As mobile telephone 414 moves to position 904, BTS1 412, or mobile telephone 414, realizes that mobile telephone 414 must be handed off to another BTS, in this case BTS2 410. The mobile telephone 414 then sends a HO message to both BTSs 410 and 412, as shown by messages 906 and 908. The mobile telephone 414 is served by the BTS1 412 via path 912 from BTS1 to mobile telephone 414 and path 914 from the FA 406 to BTS1 412 until the mobile telephone 414 reaches position 910, when it can be anchored to BTS2 410 via BTS1 412 and path 916, and the BTS1 412 sends a location update to the FA 406 via path 914 for the mobile telephone 414. The FA 406 then sends an update to the HA 420. The mobile IP packet is then delivered to the mobile telephone 414 via path 918, which is from FA 406 through BTS1 412 to BTS2 410 to mobile telephone 414 until the FA 406 is updated, whence the mobile telephone 414 will receive packets directly from the FA 406 to the BTS2 410 via path 920 after the FA 406 and HA 420 are updated and the handoff is completed.

Inter FA HO

Figure 11:
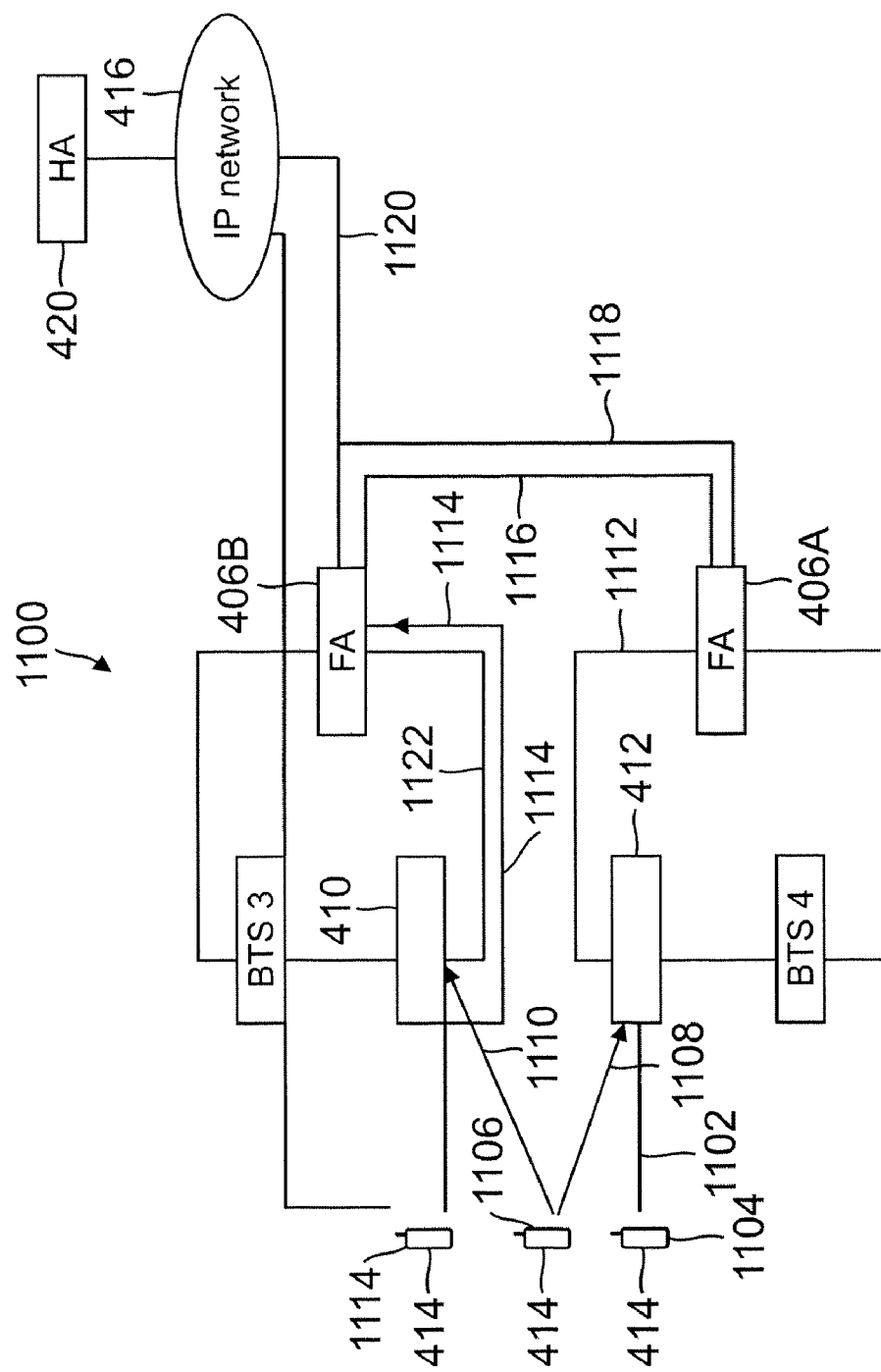
FIG. 11 illustrates an Inter-FA handoff architecture in accordance with the present invention.

FIG. 11 illustrates an Inter-FA handoff architecture in accordance with the present invention. Architecture 1100 illustrates two FAs, 406A and 406B. Similar to FIGS. 9 and 10, BTS2 412 establishes an IP connection 1102 with the mobile telephone 414 at position 1104. The mobile telephone 414, as it moves from position 1104 to 1106, requires a hand off and sends a message to both BTS 412 and BTS 410 via paths 1108 and 1110. While communicating through BTS 412 exclusively, messages from the HA 420 are transmitted and received at the mobile telephone 414 via FA 406A and IP network 416, and path 1112 to BTS 412. However, since BTS 410 is coupled to FA 406B, an inter-FA handoff (HO) must occur.

The mobile telephone at position 1114 is served by BTS 410 by anchoring to the IP network 416 and HA 420 through BTS 410. Until the updates to the FA 406B and HA 420 are completed, BTS 410 uses communications path 1114 to communicate to FA 406B, which uses communications path 1116 to communicate to FA 406A, which uses communications paths 1118 and 1120 to communicate to the IP network 416 and ultimately the HA 420. Once the handoff between FA 406A and FA 406B is complete and the FA 406A and 406B and HA 420 are updated with the mobile telephone 414 position, communication from the mobile telephone 414 occurs through path 1122 and 1120 to the IP network 416.

Migration Strategy and Potential Benefits

Figure 12:
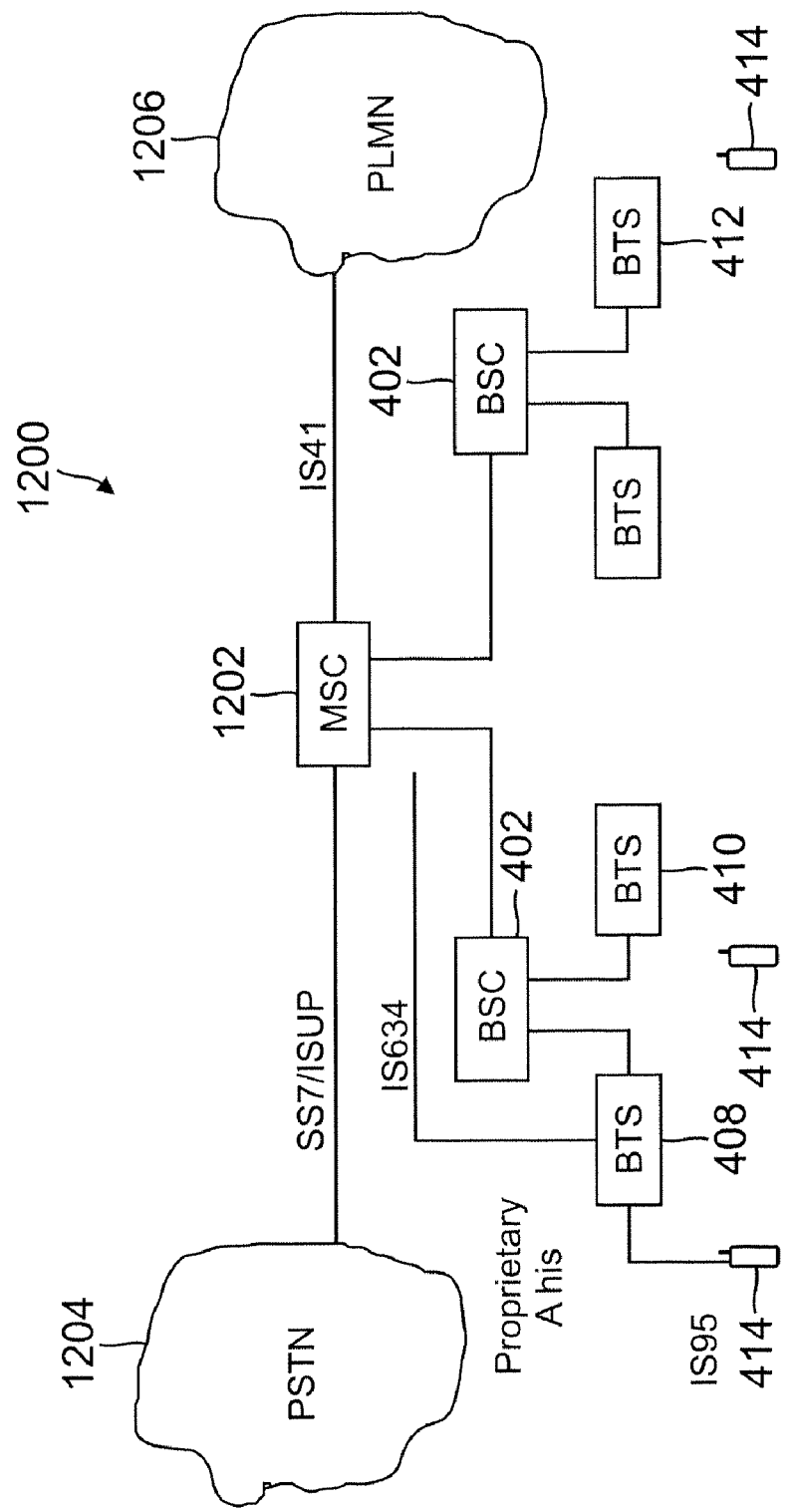
FIG. 12 illustrates the current network architecture of the cellular telephone network.

FIG. 12 illustrates the current network architecture of the cellular telephone network.

Cellular network 1200 comprises MSC 1202 coupled to BSC 402 via IS 634 protocol connections. MSC 1202 is also coupled to PSTN 1204 via SS7/ISUP protocols, and to PLMN 1206 via IS41 protocols. Each BSC 402 is coupled to BTS 408-412, which communicate to mobile telephones 414 via IS95 protocols.

Figure 13:
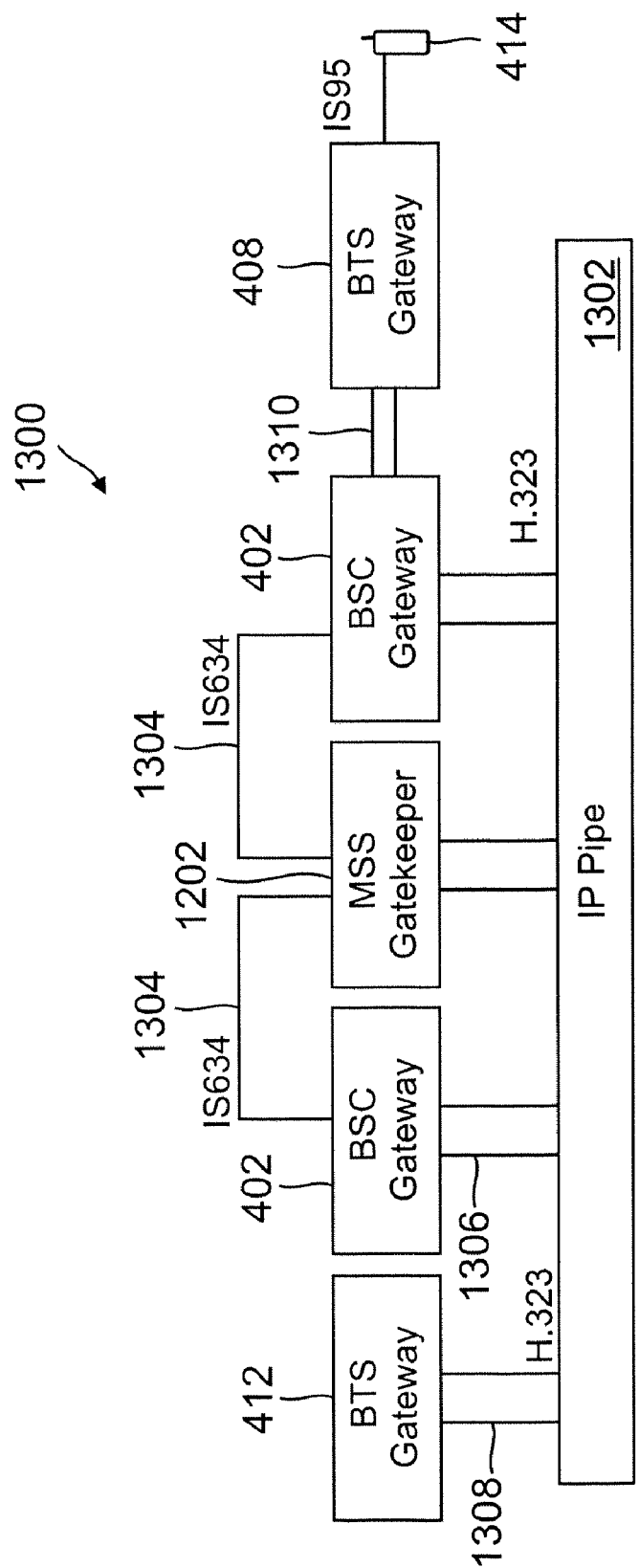
FIG. 13 illustrates a stage 1 migration to an integrated IP-cellular network.

FIG. 13 illustrates a stage 1 migration to an integrated IP-cellular network. The present invention also proposes a migration strategy for existing cellular operators to painlessly transfer from the current architecture 1200 to a network architecture 1300 which incorporates the IP into the cellular network.

As shown in FIG. 13, architecture 1300 uses the IP pipe 1302 with an H.323 protocol to communicate between MSS 1202 and BSC 402. The IP pipe 1302 can be used in parallel with the IS634 connections 1304, or as a substitute for the IS634 connections 1304. Further, the IP pipe 1302 can be used to couple the BSC 402 to the as shown by paths 1306 and 1308 BTS 412. This connection between BSC 402 and BTS 408-412 can be in parallel with connection 1310 between BSC 402 and BTS 408-412, or as a replacement for connection 1310. As such, the IP pipe 1302 can be installed in sections between MSC 1202 and BSCs 402, and from BSCs 402 to BTS 408-412, to minimize the impact to the current cellular system 1200. As needed, the IS634 paths 1304 and/or the paths 1310 can be removed from the cellular system 1200 to migrate the system to an IP-based cellular transmissions system 1300.

Initially, the current infrastructure is transformed to an IP backbone using the IP pipe 1302 for voice and data transfer. This requires a co-existence of both the IP and SS7 based networks. The PLMN network element platform can be shifted to a PC/router/DSP based platform, and the current backbone can be transformed to a private managed IP network for more efficient data transfer. This allows current carriers to maintain current call processing signaling on existing PLMN infrastructures, transmit voice and data by using the IP pipe, reduce further infrastructure investments, and set up a migration foundation for the next generation backbone.

Figure 14:
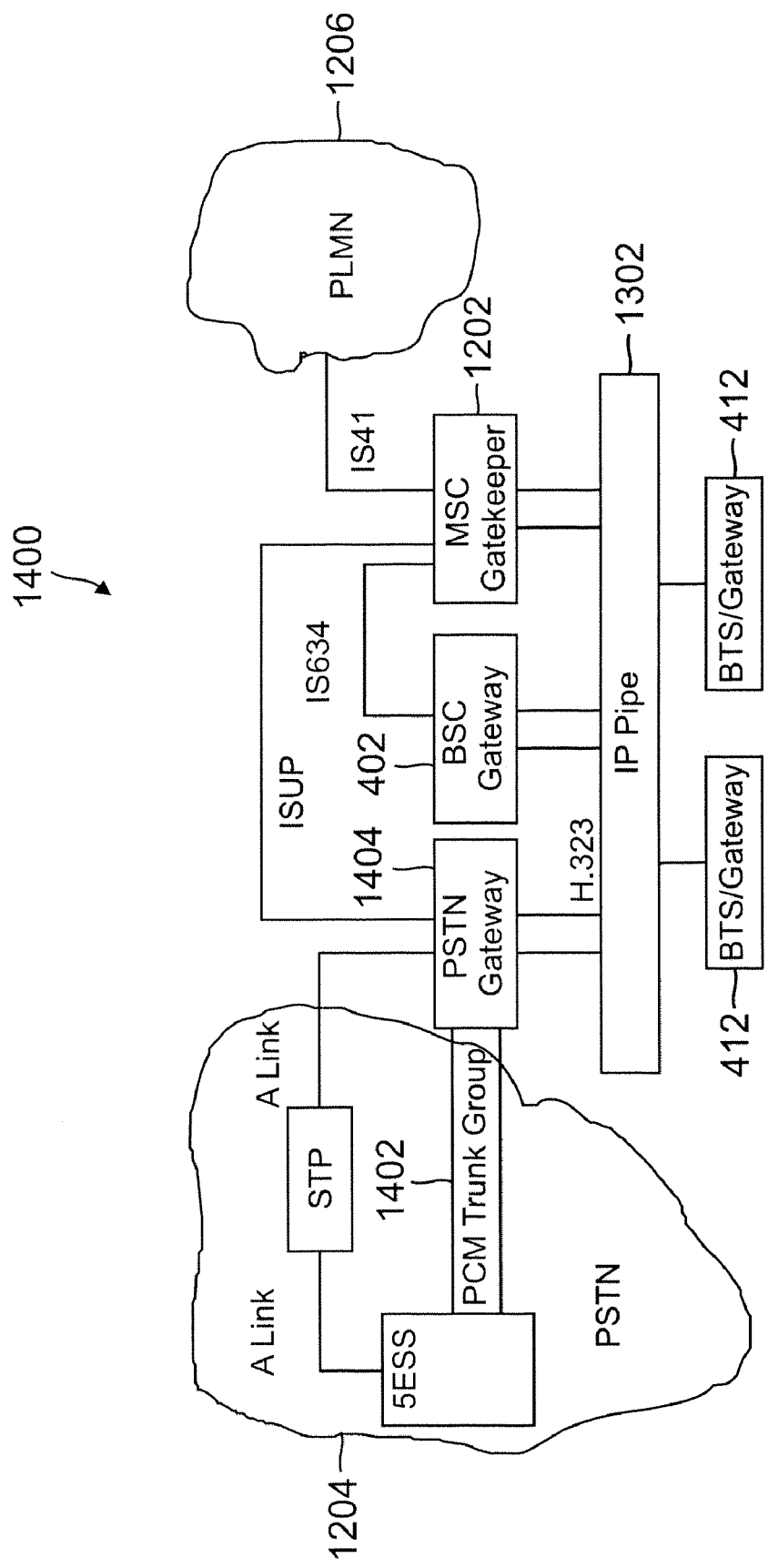
FIG. 14 illustrates the second stage of migration.

FIG. 14 illustrates the second stage of migration. The second stage of migration is shown in architecture 1400, which pushes the IP as close to the mobile user as possible. This is performed by integrating existing SS7 related features into an IP based system using the IP pipe 1302, merging existing PLMN network elements into the IP network and using a single IP network to cover PLMN and other network traffic. This approach takes advantages of available and expanding IP networks and features. The main benefits of pushing IP stack down the network chain as far as possible are a unified network management interface, increased availability of applications, and an efficient use of bandwidth.

The IP pipe 1302, or the "backbone" of the system, is used to unify the MSC 1202, BSC 402, and BTS 408-412, while maintaining the MSC 1202 role as gatekeeper for the PLMN 1206 and providing a gateway for the PSTN 1204 PCM trunks 1402 at PSTN gateway 1404. This unifies all of the voice and data traffic on the IP Pipe 1302, and allows the system to operate at higher efficiencies.

A third stage of migration uses a VPN for wireless data transfer. After inter-working functions are fully integrated as described with respect to FIGS. 14 and 15, e.g., SS7, H.323, ISUP, IS41, etc., cellular traffic can eventually run on a VPN to a VPN with guaranteed QoS and time of arrival.

Process Chart

Figure 15:
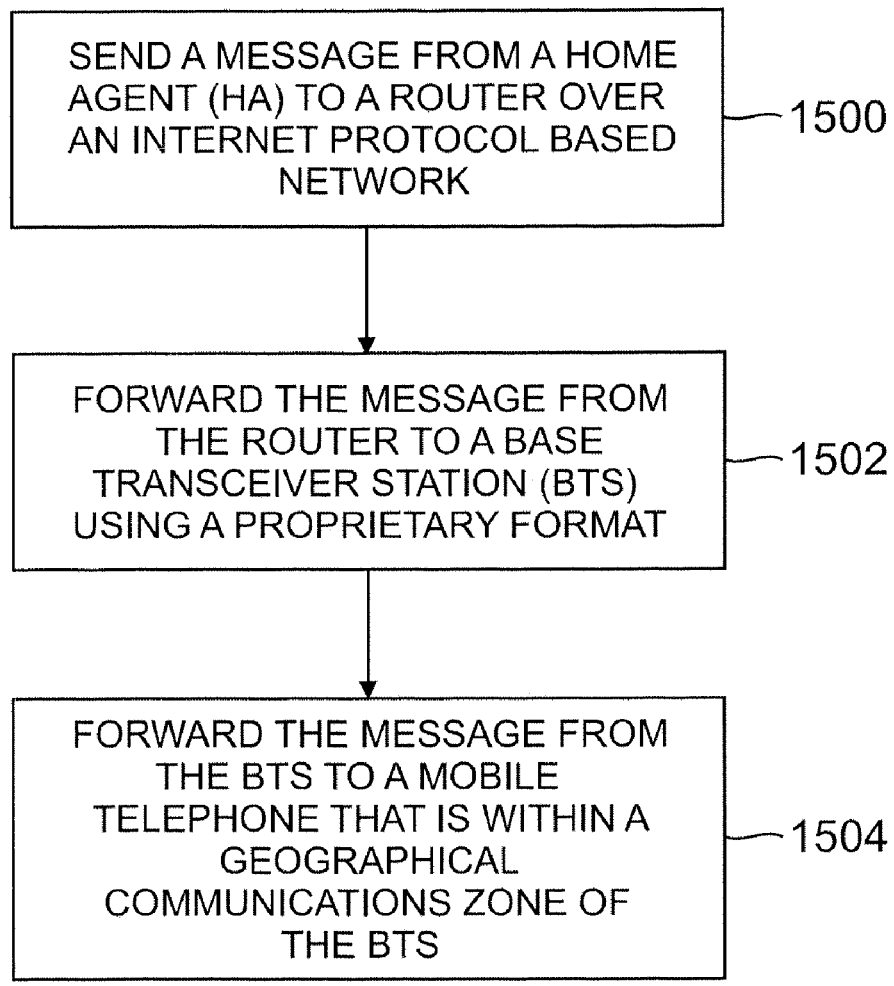
FIG. 15 is a flow chart illustrating the steps used to practice the present invention.

FIG. 15 is a flow chart illustrating the steps used to practice the present invention.

Block 1500 illustrates the step of sending a message from a home agent (HA) to a router over an internet protocol based network.

Block 1502 illustrates the step of forwarding the message from the router to a base transceiver station (BTS) using a proprietary format.

Block 1504 illustrates the step of forwarding the message from the BTS to a mobile telephone that is within a geographical communications zone of the BTS.

CONCLUSION

The present invention presents four proposals on migrating the current cellular network to an IP-based network. The traditional issues associated with cellular network, e.g., mobility, call processing, HO, AAA, voice, and data services are addressed by integrating several standard proposals in the IP/cellular industries. With QoS enhancements at the IP layer, and a wider available bandwidth, the present invention provides a total IP solution that supports soft hand offs. With the advancement in IP networks, the present invention also envisions a solution for cellular operators that subscribe a VPN among all the BTS for guaranteed services.

This concludes the description of the preferred embodiment of the invention. The following paragraphs describe some alternative methods of accomplishing the same objects. The present invention, although described with specific protocols, can use other protocols to accomplish the same goals.

In summary, the present invention discloses a system and a method for communicating over an internet protocol-based communications networks. The system comprises a handoff server, a Base Transceiver Station (BTS), and a home agent (HA). The BTS communicates with a mobile telephone within a transmission area associated with the BTS, and the handoff server communicates with the BTS using a proprietary interface. The HA communicates with the handoff server for transmitting messages through an internet-protocol network wherein messages between the HA and the mobile telephone use an internet protocol between the HA and the handoff server and the proprietary interface between the router and the BTS. The method comprises sending a message from a home agent (HA) to a router over an internet protocol based network, forwarding the message from the router to a base transceiver station (BTS) using a proprietary format, and forwarding the message from the BTS to a mobile telephone that is within a geographical communications zone of the BTS.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for integrating cellular telephone and internet protocol networks, comprising:
   at least one router for routing voice calls and data on both an internet protocol network and a cellular telephone network, wherein the router converts the voice calls and data on the cellular telephone network into an internet protocol for transmission on the internet protocol network, and the router converts the voice calls and data on the internet protocol network into a cellular telephone protocol for transmission on the cellular telephone network;
   at least one base transceiver station, directly coupled to the router using the cellular telephone network, for communicating the voice calls and data with a mobile telephone using radio frequency signals within a transmission area associated with the base transceiver station and for transferring the voice calls and data between the mobile telephone and the router; and
   at least one home agent and foreign agent, both directly coupled to the router via the internet protocol network, for forwarding the voice calls and data to the mobile telephone based on an internet protocol address for the mobile telephone, wherein the home agent registers a mobile telephone with the foreign agent, the home agent tunnels the voice calls and data for the mobile telephone to the foreign agent through the router, and the foreign agent delivers the tunneled voice calls and data to the mobile telephone via the router using the internet protocol address for the mobile telephone.

2. The system of claim 1, wherein the router performs mobility management, call processing and radio resource management for the cellular telephone network and the internet protocol network.

3. The system of claim 1, wherein both the home agent and foreign agent direct the voice calls and data to the mobile telephone using the internet protocol address for the mobile telephone.

4. The system of claim 1, wherein the cellular telephone network is not an internet protocol network.

5. The system of claim 1, wherein the home agent registers a mobile telephone with the foreign agent when the mobile telephone is not in its home network.

6. The system of claim 1, wherein the home agent tunnels the voice calls and data for the mobile telephone to the foreign agent through the router when the mobile telephone is not in its home network.

7. The system of claim 1, wherein the foreign agent delivers the tunneled voice calls and data to the mobile telephone via the router using the internet protocol address for the mobile telephone when the mobile telephone is not in its home network.

8. The system of claim 1, wherein the base transceiver station is a first base transceiver station, and a handoff between the first base transceiver station and a second base transceiver station is performed through the internet protocol network.

9. The system of claim 8, wherein:
   the mobile telephone is handed off to the second base transceiver station, which is controlled by the router that controls the first base transceiver station, using a handoff message sent to both the first base transceiver stations and the second base transceiver station;
   the mobile telephone is served by the first base transceiver station until the mobile telephone can be anchored to the second base transceiver station, at which time a location update for the mobile telephone is sent to the foreign agent; and
   the voice messages and data are delivered to the mobile telephone from the foreign agent, through the first base transceiver station, through the second base transceiver station, and then to mobile telephone, until the foreign agent is updated by the location update for the mobile telephone, whence the mobile telephone receives the voice messages and data directly from the foreign agent, through the second base transceiver station, and then to the mobile telephone, without going through the first base transceiver station, after the foreign agent is updated by the location update for the mobile telephone and the handoff is completed.

10. The system of claim 8, wherein the router is a first router, the foreign agent is a first foreign agent, and the handoff is performed from the first router and the first foreign agent to a second router and a second foreign agent using the internet protocol network.

11. The system of claim 10, wherein:
    the mobile telephone is handed off to the second base transceiver station, which is controlled by the second router that does not control the first base transceiver station, using a handoff message sent to both the first base transceiver stations and the second base transceiver station;
    the mobile telephone is served by the first base transceiver station until the mobile telephone can be anchored to the second base transceiver station, at which time a location update for the mobile telephone is sent to the first foreign agent, the second foreign agent, and the home agent; and
    the voice messages and data are delivered to the mobile telephone from the first foreign agent, through the second foreign agent, through the second base transceiver station, and then to mobile telephone, until the first foreign agent, the second foreign agent, and the home agent are updated by the location update for the mobile telephone, whence the mobile telephone receives the voice messages and data directly from the home agent, through the second foreign agent, through the second base transceiver station, and then to the mobile telephone, without going through the first foreign agent and the first base transceiver station, after the first foreign agent, the second foreign agent, and the home agent are updated by the location update for the mobile telephone and the handoff is completed.

12. The system of claim 8, wherein the handoff is a soft hand off performed between the first base transceiver station and the second base transceiver station using asynchronous transfer mode communications between the router and the first base transceiver station, and the router and the second base transceiver station.

13. The system of claim 1, wherein the router is a hand-off server, and the mobile telephone, the base transceiver station and the handoff server communicate using internet protocol in the asynchronous transfer mode connection.

14. The system of claim 13, wherein, when a handoff is not being performed, the mobile telephone is connected to the base transceiver station through a virtual circuit, and the base transceiver station is connected to the handoff server using internet protocol in the asynchronous transfer mode connection.

15. The system of claim 13, wherein, when a handoff is performed, the mobile telephone is connected to the handoff server directly through the asynchronous transfer mode connection.

* * * * *